Figure 1:
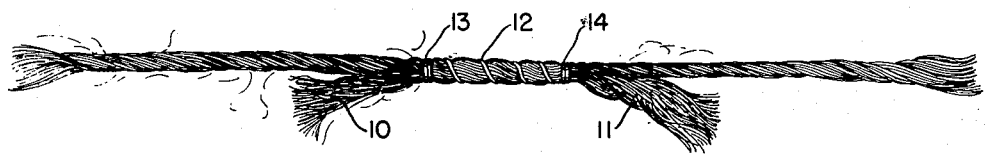

Aug. 5, 1952     G. N. WILLIS     2,605,603
JOINT FOR TWINE
Filed April 17, 1951

INVENTOR.
Grant N. Willis
BY
Kenway, Jenney, Witter & Hildreth
Attys.

Patented Aug. 5, 1952

2,605,603

UNITED STATES PATENT OFFICE 2,605,603

JOINT FOR TWINE

Grant N. Willis, Bristol, Conn., assignor to Plymouth Cordage Company, Plymouth, Mass., a corporation of Massachusetts Application April 17, 1951, Serial No. 221,485

3 Claims. (Cl. 57—142)

This invention comprises a new and improved joint for securing together two ends of twine or other cordage for transmitting straight line tension between the parts leading from the joint. It is intended to replace joints which have hitherto customarily been made by tying two ends of twine together in a knot.

The invention is herein described as employed in connection with binder twine, but it is not limited in its application to this or to any specific type of cordage.

Heretofore the practice have been to join the ends of binder twine by means of the conventional binder knot. It has long been known, however, that such a knot is not reliable for much more than about 50% of the strength possessed by the twine in which the knot is made, the variations in actual knot efficiency depending on such factors as the kind of fibre, size of twine, amount of twist, and lubrication. Other types of knots, such as the weaver's knot, may have a slightly higher strength efficiency but still result in a joint strength far below that of the full twine strength.

The main reason why a knot is not efficient is that all of the fibres do not share equally in the load when tension is applied. Because the twine is wrapped around itself in a knot, the outside fibres are much more highly stressed than the inside fibres near the center of the bend. Consequently, when load is applied to the knot, the outside fibres fail first, and then the inside fibres fail as the load is transferred to them; but at no time do all of the fibres share equally in the total load.

It has of course been long appreciated that a great saving in twine might be effected by some joint having a strength at breakage that would be closer to the breakage strength of the twine— preferably substantially equal to it. Higher joint strength would make it possible to use smaller twine having greater footage per pound, or permit making a heavier bale if twine of the same size were used.

Baler twine, as ordinarily known in the cordage industry, is a single ply yarn of hard fibre running about 220 feet to the pound, and having a diameter of about ⅛". In this specification the term "twine" is used as meaning specifically baler twine and to typify all other types of cordage in which the improved joint is applicable.

A principal industrial use of baler twine is in baling hay and in packaging other commodities where the ends of each separate band about the bale must be joined together to withstand the resilient expansion of the freshly compressed bale, and to hold against subsequent stress in handling and transportation. Usually the baling press maintains sufficient compression or constriction of each new bale to permit slack at the ends of its bands for the making of knots. This slack disappears by expansion of the bale upon release from the press and immediately subjects the bands of twine to severe tension.

The present invention constitutes a satisfactory and efficient solution of the problem which has plagued the industry for a great many years, and provides as a substitute for such knots a novel type of joint or tie that develops substantially the full strength of the twine.

Other objects of the invention are to provide a type of joint which may be made quickly by persons of ordinary skill with tools and devices of simple and inexpensive character, and a joint that will provide the other benefits which attend the procedure and structure herein disclosed.

Going more into detail, the joint of this invention comprises in combination with the two end parts of twine which are to be joined, arranged in overlapping relation and extending thence in opposite directions, a short coil of continuous stiffly bendable wire having spaced turns encircling and constricting the overlapping end parts of the twine but adapted to yield slightly with the twine when the latter is elongated under lengthwise strain. All of the fibres are comparatively parallel to each other. As load is applied, the highly stressed fibres are permitted to slip slightly with respect to the other fibres, thereby transferring part of the load to the other fibres. It is this equalizing action, whereby all of the fibres are permitted to share in the total load, which gives the wire tie its relatively high efficiency.

As the load is applied to the wire tie, some slippage of the individual fibres takes place through the end loops of the tie. Consequently, some of the load is taken by the first spiral inside the end loops. This causes the first spiral to yield slightly, thereby transferring some of the load to the second spiral, etc. As a result, the loads taken by each of the spirals is additive.

The end loops on the wire tie are shown as close wound and are included for finish and to avoid protruding sharp ends; they contribute to the strength of the tie, but its strength comes principally from the snubbing action of the center turns. As the wire is applied to the twine bundle, the twine fibres are forced to assume a spiral deformation, thus providing a snubbing action as load is applied.

In dealing with binder twine in which the close-wound turns of the clip have an external diameter of about ¼", the two groups of close-wound turns may be separated by an intermediate spiral portion approximately 1" in length, or about four times the external diameter of the close-wound turns. In such a joint it is contemplated that soft steel wire about 0.06" will be employed. In repeated tests such a joint has been shown to possess in tension 90% of the ultimate strength of the twine itself.

If the coils are to be applied by machinery, they preferably will be formed as they are being applied from a supply of wire held in a reel. The machine, taking the wire from the reel, will form the coil around the overlapped ends of the twine, cut it off from the supply, and apply to it the necessary constricting pressure and shape to produce the joint. The constriction is accomplished by diametrical squeezing operation which reduces the coil to a smaller helical diameter and so, by constrictive indentation of the twine mass from all directions, clamps the fibrous mass in engagement within the turns of the coil.

Figure 2:
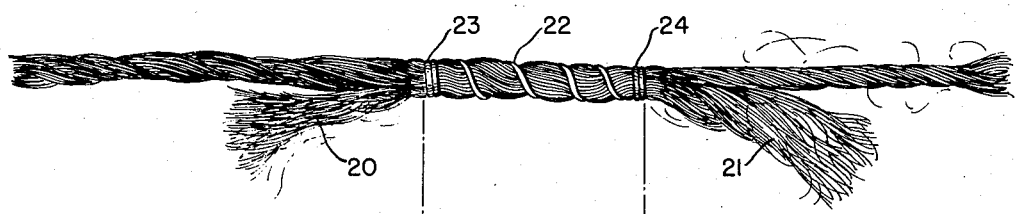
Figure 3:
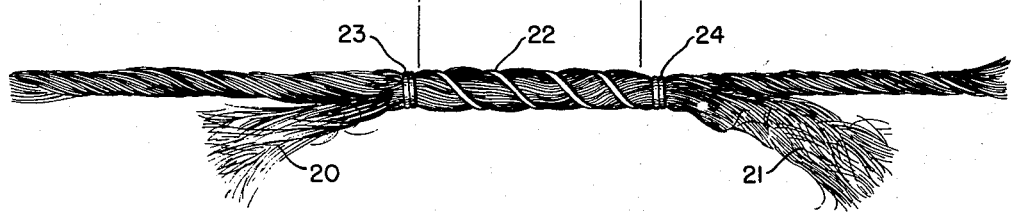

These and other features of the invention will be best understood and appreciated from the following description of a preferred embodiment thereof, selected for purposes of illustration and shown in the accompanying drawings in which:

Figs. 1 and 2 show the joint in twine of two different sizes, under untensioned conditions, and Fig. 3 shows the joint of Fig. 2 under conditions of severe tension.

As shown in Fig. 1, the two ends 10 and 11 of the twine, herein shown as binder twine, are brought into overlapping relation in straight parallel condition, the total overlap being in this case about 3½". Having thus located the twine, a short piece of stiffly bendable steel wire is wound about the overlapping ends, starting with an intermediate portion 12 which is shown as comprising about four turns spaced with a pitch which roughly approximates the diameter of the turns. The intermediate portion 12 is about 1" in length and terminates at each end in a pair of close-wound turns 13 and 14.

Figs. 2 and 3 illustrate a joint of the same character formed in twine of somewhat larger diameter. In this instance the ends 20 and 21 are brought into overlapping relation and the wire forming the joint is formed with an intermediate spiral portion 22 with turns substantially separated, and two end portions 23 and 24 comprising a pair of close-wound turns.

By comparing Figs. 2 and 3 the action of the joint under stress will be apparent. The intermediate portion 22 forces the twine fibres to assume a spiral deformation but is permitted to elongate slightly with the enclosed fibre of the twine thus providing a snubbing action whereas the engagement of the close-wound turns 23 and 24 is not disturbed. The dot and dash lines between the two figures indicate in somewhat exaggerated form the elongation occurring in the joint itself.

The direction of twist in the coil 12 is a matter of secondary importance. While a right hand twist is shown in the drawings it will be apparent that a coil formed with a left hand twist would be equally effective.

Having thus disclosed my invention and described in detail embodiments thereof, I claim as new and desire to secure by Letters Patent:

1. A twine joint for transmitting straight line tension, comprising two end parts of twine which are to be joined, arranged in overlapping relation and extending thence in opposite directions, a coil of continuous stiffly bendable wire having at each end a group of close-wound turns encircling and constricting overlapping portions of both parts of the twine and connected by an intermediate spiral portion having its adjacent turns separated by a pitch at least as great as the diameter of the close-wound turns, whereby the twine fibres of overlapped parts are forced to assume a spiral deformation and permitted to elongate slightly with the spiral portion of the coil under lengthwise tension.

2. A twine joint for transmitting straight line tension, comprising with two end parts of twine which are to be joined, arranged in overlapping relation and extending thence in opposite directions, and a coil of continuous stiffly bendable wire having at each end a group of close-wound turns encircling and constricting the overlapping end parts of the twine and an intermediate spiral portion having spaced turns encircling the twine in snubbing engagement and forcing the twine fibres to assume a spiral deformation but adapted to yield slightly with the twine when the latter is elongated under lengthwise tension.

3. A twine joint for transmitting straight line tension, comprising with two end parts of twine which are to be joined, arranged in overlapping relation and extending thence in opposite directions, and a coil of continuous stiffly bendable wire having spaced turns encircling and constricting the overlapping end parts of the twine and forcing the twine fibres into a spiral deformation with snubbing engagement while permitting an equalizing slippage of the fibres with elongation of the coil under lengthwise tension.

GRANT N. WILLIS.

No references cited.